US007972561B2

(12) United States Patent
Viovy et al.

(10) Patent No.: US 7,972,561 B2
(45) Date of Patent: Jul. 5, 2011

(54) MICROFLUIDIC DEVICE

(75) Inventors: Jean-Louis Viovy, Paris (FR); Claus Futterer, Paris (FR); Nicolas Davis Minc, Paris (FR); Jean Rossier, Paris (FR); Jean-Hugues Codarbox, L'Hay les Roses (FR)

(73) Assignees: Centre National de la Recherche, Paris (FR); Institut Curie, Paris (FR)

( * ) Notice: Subject to any disclaimer, the term of this patent is extended or adjusted under 35 U.S.C. 154(b) by 859 days.

(21) Appl. No.: 10/557,308

(22) PCT Filed: May 19, 2004

(86) PCT No.: PCT/FR2004/001236
§ 371 (c)(1),
(2), (4) Date: Nov. 18, 2005

(87) PCT Pub. No.: WO2004/103566
PCT Pub. Date: Dec. 2, 2004

(65) Prior Publication Data
US 2006/0275179 A1    Dec. 7, 2006

(51) Int. Cl.
*G05D 7/00*    (2006.01)
(52) U.S. Cl. .............. 422/110; 422/6; 422/50; 422/259; 200/81 R; 137/261; 137/262; 137/391; 137/487; 137/504
(58) Field of Classification Search .................. None
See application file for complete search history.

(56) References Cited

U.S. PATENT DOCUMENTS

| 3,590,910 | A  | * | 7/1971  | Lorenz ........................ 165/221 |
| 5,195,494 | A  | * | 3/1993  | Tuckey ........................ 123/514 |
| 5,578,179 | A  |   | 11/1996 | Demorest et al. |
| 5,726,404 | A  |   | 3/1998  | Brody |
| 6,012,902 | A  |   | 1/2000  | Parce |
| 6,296,020 | B1 |   | 10/2001 | McNeely et al. |
| 6,395,232 | B1 |   | 5/2002  | McBride |
| 6,408,878 | B2 |   | 6/2002  | Unger et al. |
| 6,875,619 | B2 | * | 4/2005  | Blackburn ........................ 506/9 |

(Continued)

FOREIGN PATENT DOCUMENTS
WO    WO 01/04909 A1    1/2001
WO    WO 01/88204 A1    11/2001

OTHER PUBLICATIONS

Effenhauser, Caelo S., et al, Glass Chips for High-Speed Capillary Electrophoresis Separations with Submicrometer Plate Heights, 1993, Analytical Chemisry, vol. 65, pp. 2837-2642.*

(Continued)

*Primary Examiner* — Vickie Kim
*Assistant Examiner* — Robert Xu
(74) *Attorney, Agent, or Firm* — Oliff & Berridge, PLC

(57) ABSTRACT

The invention relates to a microfluidic device comprising at least one micro-channel connected at one end to an enclosed area, characterized in that it also comprises an inlet circuit and an outlet circuit connected to the enclosed area and between which the fluid can be discharged without any contact with the micro-channel, wherein at least one of said inlet and outlet circuits can be controlled in such a way that the pressure at the end of the micro-channel can be modified independently from the pressure at the other end of the micro-channel.

22 Claims, 6 Drawing Sheets

U.S. PATENT DOCUMENTS

Figure 1:
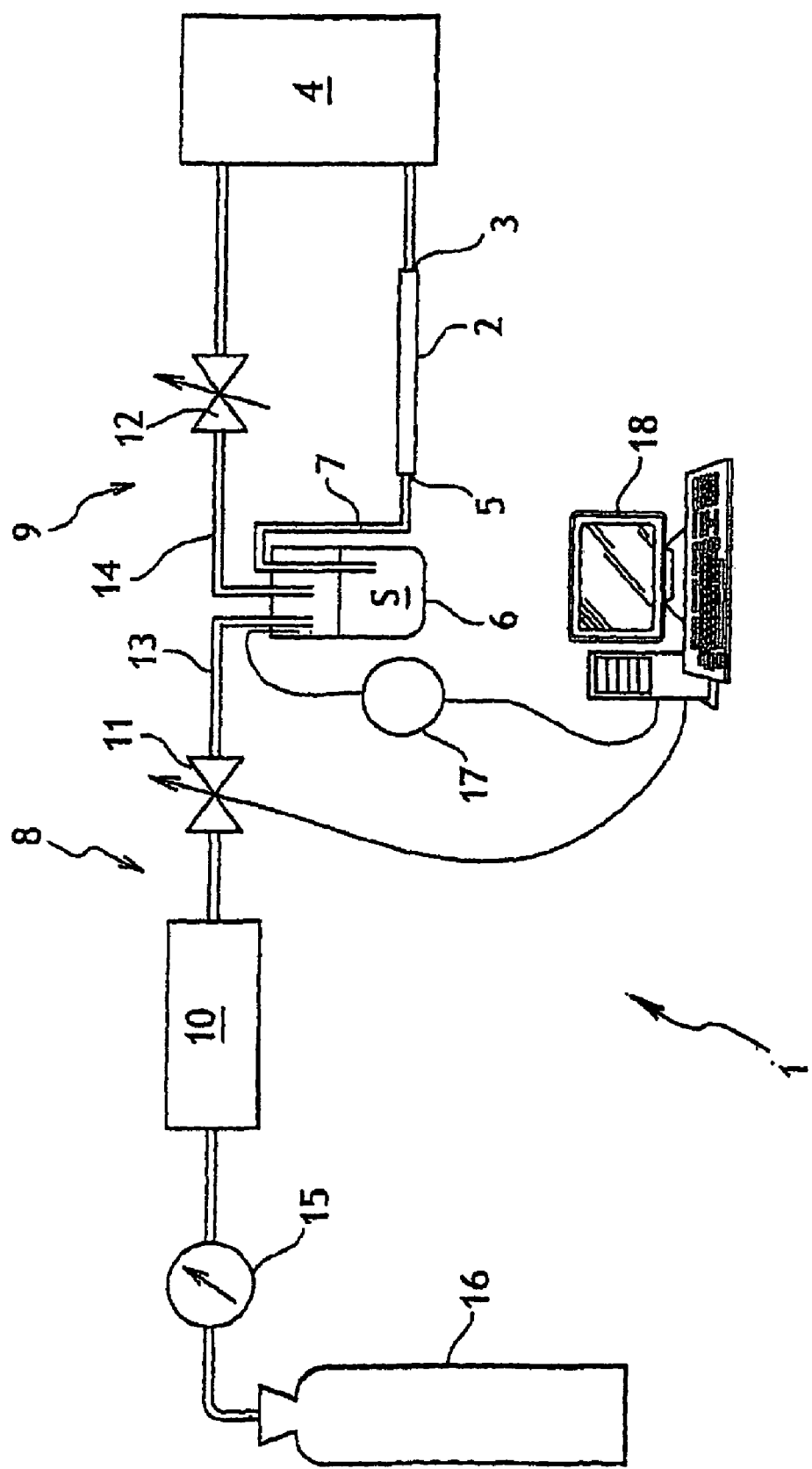

2002/0033193 A1     3/2002    McNeely et al.
2002/0168780 A1    11/2002    Liu et al.

OTHER PUBLICATIONS

Doyle et al., "Self-Assembled Magnetic Matrices for DNA Separation Chips," Science, vol. 295, (Mar. 22, 2002), p. 2237.

C.S. Effenhauser et al., "Glass Chips for Hight-Speed Capillary Electrophoresis Separations with Submicrometer Plate Heights," Anal. Chem. 1993, 65, pp. 2637-2642.

Xia et al., "Soft Lithography," Angew. Chem. Int. Ed. 1998. 37 pp. 551-575.

* cited by examiner

MICROFLUIDIC DEVICE

The invention relates to a microfluidic device and to its applications.

In technical fields such as the field of the analysis of biological molecules or macromolecules, biotechnologies, medical applications, chemical synthesis or microelectronics, it is necessary to be able to handle and analyze product samples the volume of which is of the order of 1 microliter or smaller still.

This allows work to be carried out on precious low-volume samples, allows the quantities of consumables (carriers, labels, etc.) used to be reduced, makes it possible to work in parallel on numerous samples, allows exchanges of matter or of heat to be accelerated, and reduces transport times.

Devices known as "microfluidic" devices or alternatively "micrototal analysis systems (microTAS)" have currently been developed. These devices generally comprise microchannels in which various operations can be performed automatically on a sample.

By way of example, a microfluidic diagnostics device makes it possible, on a sample such as a drop of blood distributed in microchannels, to perform a preprocessing of the sample (for example cell lysis or DNA extraction or protein extraction), possibly an enrichment or a separation (chromatography, electrophoresis), followed by the detection of predetermined molecules using techniques which may be of varying types: optical (by fluorescence, luminescence, plasmon resonance), electrical or electrochemical (by conductivity, cyclic amperometry) or electronic (using field-effect transistors, biosensors, vibrating micromechanical structures, etc).

Applications such as DNA analysis, cell sorting, the synthesis of chemical compounds, the purification or enrichment of a product in terms of one or several species, actions of transferring heat for cooling or heating a component, nucleic acid amplification reactions, are possible using such microfluidic devices.

The microfluidic devices may, in general, comprise a more or less flat support, produced by engraving, molding, hot compression, or other methods, resulting in particular from electroelectronics. Examples of methods for preparing such devices are set out in the work by M. Madou entitled "Fundamentals of Microfabrication", CRC Press, 1997. In an alternative, the microfluidic devices may comprise non-planar supports, being for example incorporated into thin and flexible films. The microfluidic devices may alternatively comprise more or less cylindrical microchannels.

The expression "microfluidic device" is used to denote a device involving the transportation of a product within at least one microchannel. The expression "microchannel" is intended to denote a channel which, over at least a portion of its length, has a cross section of which at least one dimension, measured in a straight line from one edge to an opposite edge, is appreciably less than one millimeter.

A microchannel may, for example, have a surface/volume ratio appreciably higher than 1 $mm^{-1}$, preferably 4 $mm^{-1}$, for example 10 $mm^{-1}$, or even 1 $\mu m^{-1}$.

The term "microchannel" also encompasses a nanochannel.

The microchannel may have a constant or non-constant cross section. This cross section may, for example, be circular, rectangular, square or have a dish shape.

When the cross section is rectangular, the microchannel may, for example, have a thickness of between 10 $\mu m$ and 100 $\mu m$ and a width of between 20 $\mu m$ and 1 mm, particularly a width of between 20 $\mu m$ and 500 $\mu m$.

In general, the microchannel may have a length of between 1 mm and 50 cm, particularly of between 1 cm and 10 cm, for example of 2 cm.

The small-sized cross section of the microchannel raises numerous problems, often difficult ones, associated in particular with wetting, with capillary forces, or with high hydrodynamic resistance.

In closed devices, the possible appearance of bubbles within the sample may give rise to parasitic flow as a result of low-amplitude temperature changes.

In open devices, communicating for example with one or more reservoirs, the presence of meniscusses, evaporation, differences in level, may also lead to parasitic flow.

In order to avoid this parasitic flow it is possible to incorporate microvalves into the microfluidic device. However, this solution is complicated from the point of view of manufacture and does not completely remedy the aforementioned disadvantages, especially the difficulties associated with bubbles.

Another difficulty associated with microfluidic devices is that of imposing well controlled flow.

U.S. Pat. No. 6,012,902 discloses a microfluidic device employing electric field electroosmosis. One limit to this approach is that it is suited only to conductive liquids, and that it is very sensitive to the surface charge of the microchannel, which can vary over time, especially when working with biological molecules.

Devices incorporating micropumps are also known. For example, U.S. Pat. No. 6,408,878 discloses membrane pumps incorporated into a microfluidic device. U.S. Pat. No. 6,296,020 proposes the use of passive valves within the microchannels. These devices are relatively complicated to manufacture, delicate and expensive.

Devices in which pumping is done externally have also been proposed. For example, mention may be made of syringe micropumps. Nonetheless, it is difficult using these to control small volumes, and the flow rates generated may prove to be too high or marred by hysteresis.

The use of peristaltic pumps has also been proposed, but these may give rise to pulsation which is very troublesome to certain applications.

Flow control may also be had using a hydrostatic pressure. However, this method does not allow easy access to a wide range of pressures.

US 2002/033193 proposes opening and closing the channels remotely, by controlling the movement of air from the microchannel when this microchannel is full of a liquid: by using a valve to prevent the air from leaving, the movement of the fluid is halted. Like all devices in which gas is enclosed within the microchannel, small temperature variations may give rise to very large changes in volume and to parasitic flow.

In WO 01/04909, pressure pulses are created within the gas contained in one or several closed reservoirs in communication with a channel of the microfluidic device. As in the case of peristaltic pumps, this gives rise to troublesome pulses in the flow. Furthermore, because of the high hydrodynamic microchannels through the microchannels, the time to attain equilibrium is relatively lengthy, and this makes dynamic control of the flow difficult. Finally, small variations in the temperature of the gas may lead to a change in pressure which in return is accompanied by a change in the properties of the flow, and it is necessary to provide a device which is very well temperature-regulated, something which is both complex and expensive.

WO 01/88204 discloses a microfluidic circuit comprising a microchannel opening at one end into a reaction chamber communicating with two lateral air ducts, one of which is connected to a positive pressure regulating device and the other of which is connected to a negative pressure regulating device. Thus, the air flowing through the lateral ducts allows a gas resulting from the reaction in the reaction chamber to be discharged. This device entails circulating a gas within the microfluidic device. As mentioned earlier, in the more general case where the microchannel contains a liquid, this leads to the presence of meniscusses, which may encourage the appearance of bubbles that complicate the control and have an adverse effect on the repeatability of the processes and transport operations in the microchannel.

The present invention aims to propose a microfluidic device which solves all or some of the aforementioned disadvantages and which in particular makes it possible to obtain repeatable and controlled flows.

The invention relates more specifically to a microfluidic device in which the flow in a microchannel is obtained by applying a pressure or a depression to at least one of the ends of the microchannel.

Thus, according to one of its aspects, the subject of the invention is a microfluidic device comprising at least one microchannel connected at one end to a chamber, characterized in that it further comprises an inlet circuit and an outlet circuit which are connected to the chamber and between which a flow of fluid can be established without contact with the microchannel, at least one of the inlet and outlet circuits being controllable so as to modify the pressure at said end of the microchannel, in particular independently of the pressure at another end of the microchannel.

The invention allows precise control over the pressure at one end of the microchannel and therefore over the flow rate in the microchannel, by controlling at least one of the inlet and outlet circuits, making it possible to achieve repeatable flows.

In addition, in a device according to the invention, the flow in the microchannel may be halted after a characteristic time that is relatively short by comparison with conventional microfluidic devices, thus allowing better dynamic control over the flows in the microchannel.

In one embodiment of the invention, the aforementioned flow of fluid between the inlet circuit and the outlet circuit may occur only in the chamber.

Thus it is possible, in one embodiment, to circulate through the chamber, between the inlet and outlet circuits, a fluid that differs from the product contained in the microchannel.

Advantageously, the fluid circulating between the inlet and outlet circuits is a gas, whereas the product contained in the microchannel is a liquid.

The invention is particularly suited to controlling the flow of liquids in a microchannel or a network of microchannels, without allowing gas to enter this microchannel or this network of microchannels, the pressure of the gas contained in the chamber being transmitted by a liquid to the associated microchannel.

The inlet and outlet circuits may open directly into the chamber so that the aforementioned fluid flow occurs in the chamber. As an alternative, the inlet and outlet circuits do not open directly into the chamber and may, for example, be connected to this chamber via a single duct, the aforementioned fluid flow then not occurring in the chamber.

The chamber may be defined by a container of relatively simple shape, the inlet and outlet circuits opening into this container via ducts. However, the chamber may adopt shapes that may be complex and ramificated. The chamber may define a closed volume connected, on the one hand, to a fluid inlet orifice and, on the other hand, to an outlet orifice for this fluid, this closed volume also being connected elsewhere to at least one end of the microchannel. The pressures of the fluid flowing between the inlet orifice and the outlet orifice may reach equilibrium almost instantaneously. The expression "almost instantaneously" is to be understood as meaning that equalization is quick by comparison with the time constants with respect to which the transport of products within the microchannel is to be regulated.

According to a preferred embodiment of the invention, the microchannel or microchannels of the device are entirely filled with liquid. Each microchannel may be connected at one end to the associated chamber via a duct, each microchannel and the corresponding duct being entirely filled with one or several liquids. The risk of conveying a gas into the microchannel is thus limited, this ingress of gas could give rise to the troublesome formation of bubbles.

Each duct connecting a chamber to the associated microchannel may be flexible or rigid.

This duct may, over at least a portion of its length, have a cross section several orders of magnitude $10^n$ greater than a cross section of the microchannel, with $n \geq 1$ and preferably with $n \geq 2$.

This duct may exhibit a gradual narrowing of its cross section between the chamber and the end of the microchannel to which it is connected.

The microchannel may, for example, comprise a frustoconical portion which may, as appropriate, define the bottom of the chamber.

The microfluidic device may comprise a plate within the thickness of which one or more chambers are at least partially formed. In one embodiment of the invention, these chambers each communicate with one end of a microchannel via a duct fixed in particular to the plate.

The supply of liquid product to each chamber may be provided by a tube introduced into the duct and opening into the end thereof. That makes it possible to reduce the risk of bubbles forming in the microchannel.

The microchannel or microchannels may be produced for example by etching, or molding, by extrusion or by injection, hot or cold compression on or in a support comprising in particular two superposed plates, one defining the bottom of the microchannel or microchannels and the other the top wall of the microchannel or microchannels.

When the device comprises one or more chambers produced at least partially on a plate, the latter is preferably separate from the plates defining the associated microchannel or microchannels, so as to make manufacture of the device easier.

At least one of the inlet and outlet circuits preferably opens a non-zero distance away from the bottom of the associated chamber, this making it possible, within the chamber, to have a certain head of liquid with, above it, a gas the pressure of which is controlled using the inlet and outlet circuits.

Each chamber may have a volume greater than $10 \text{ mm}^3$, for example $1 \text{ cm}^3$. This volume may range, for example, between $10 \text{ mm}^3$ and $5 \text{ ml}$.

The flow of fluid, particularly of gas, between the inlet and outlet circuits may be appreciably continuous, that is to say appreciably constant over time, and not subject to short-time pulsing.

It is also possible to interrupt the flow transiently for a one-off operation, such as the filling of a microchannel or of a chamber for example.

Advantageously, the hydrodynamic microchannels loss over at least one of the inlet and outlet circuits, particularly over the outlet circuit, is significantly lower than that of the microchannel, preferably at least ten times lower, and better still several orders of magnitude $10^n$ lower, where $n \geq 2$.

In one embodiment of the invention, at least one of the circuits—the inlet circuit and/or the outlet circuit—comprises a source of pressure or depression such as, for example, a gas chamber, a pump, an expansion valve. As an alternative, at least one of the circuits—the inlet circuit and/or the outlet circuit—communicates with the ambient atmosphere, and the atmosphere is also in this case considered to constitute a pressure source.

The pressure sources associated with the inlet and outlet circuits respectively are at different pressures, it being possible for the pressure of the outlet circuit to be lower than that of the inlet circuit. The outlet circuit and one of the ends of the microchannel can communicate with a common pressure source, particularly the atmosphere.

As a preference, at least one of the inlet and outlet circuits comprises a progressively controllable valve, particularly a solenoid valve or a needle valve.

In one embodiment of the invention, each of the inlet and outlet circuits comprises an associated valve.

Controlling the inlet and outlet circuits using a solenoid valve makes it possible in particular to adapt the dynamics of the device to suit the need, without the need for manual intervention on the device.

At least one of the circuits—the inlet circuit and/or the outlet circuit—is advantageously connected to a dynamic regulation system able to control at least one of the circuits—the inlet circuit and/or the outlet circuit—as a function of an item of information associated with flow or pressure.

This information item may be delivered by a pressure sensor or a flow or flow rate sensor, for example. The sensors may be positioned at the microchannels, in the chamber or in the inlet and outlet circuits.

The aforementioned information item may in particular be delivered by a cascade of sensors, particularly pressure or flow rate sensors, having different operating ranges, thus making it possible to measure the pressure or the flow rate over a broad range, it being possible in particular for the sensors to switch over to switch from one range to another.

Other types of sensors may be used, such as species or molecule detectors, fluorescence, electrochemical, absorption, plasmon resonance, cyclic-amperometry, electronic, or electrical detectors, or alternatively biosensors.

The regulating system may in particular be designed to control solenoid valves of the inlet and outlet circuits and may comprise a processing unit such as a computer.

This allows high-performance automation to be used, for example so that it is possible, without human intervention, to replace product samples and/or a separation grid, to string together a multiplicity of operations such as separations, rinsing operations, product changing operations, the introduction of samples, and chemical reactions.

This also allows automatic regulation of the solenoid valves to be set in place, for example with a feedback effect from one or more sensors measuring the behavior of the fluids or products used in the device.

The inlet and outlet circuits may be monitored by image analysis. In particular, the flow in a microchannel may be observed by means of a camera and the inlet and outlet circuits may be controlled as a function of the observed movements of the product in the microchannel, with a view for example to halting all flow in the microchannel or to measuring a product flow rate.

In one embodiment of the invention, the microchannel is connected at each end to a chamber, each chamber being in communication with an inlet circuit and with an outlet circuit between which circuits a flow of fluid may be established.

In one embodiment of the invention, the device comprises a plurality of microchannels, at least two of which are each connected at one end to a chamber, each chamber being in communication with an inlet circuit and an outlet circuit between which circuits a flow of fluid may be established, at least one of the inlet and outlet circuits being controllable so as to modify the pressure at the end of the associated microchannel.

At least two of the aforementioned microchannels may be connected to one another.

Because it is possible, by virtue of the invention, quickly to modify the flows in the connected microchannels, it is possible with relative ease to distribute products, for example to send a fraction x of a product contained in one channel to a first microchannel and a fraction (1-x) to a second microchannel, and to vary the fraction x between 0 and 1.

The device, particularly when intended to carry out electrophoresis or electrochromatography, may comprise at least one electrode, and preferably at least two electrodes.

When the chamber contains a product intended to be distributed in the microchannel, the electrode is preferably placed in contact with this product, the latter being in communication with the microchannel via an electrically conductive liquid.

The invention may be used for a great many applications such as, for example, a diagnostics method, a method of analyzing, purifying or handling species contained in the product within the microfluidic device, it being possible for example for said species to contain ions, atoms, molecules, macromolecules, biological macromolecules such as nucleic acids, peptides, proteins or collections of proteins, oligosaccharides, glycopeptides, antibodies, haptenes, or alternatively organelles, cells, organic, mineral or organomineral particles, latices, micelles, vesicles or liposomes.

The invention may thus be used in the field of combinatory chemistry or in the field of hybridation or affinity analysis.

The invention may also be used for synthesizing new species from species contained in the microfluidic device and/or for modifying the physical or chemical characteristics of a product or species.

The invention may alternatively be used for high-throughput screening or drug research.

The invention may alternatively allow the production of flavorings.

The device according to the invention may be set out to perform sorting, filtration, liquid/liquid extraction, sample processing, chromatography, electro-chromatography or electrophoresis.

The device according to the invention may be used for carrying out a chemical, biological or enzyme reaction.

The invention may allow the control of flow in the microchannel particularly when the volume of certain fluids or products involved in the microfluidic device varies during the operation, for example following a chemical reaction, a change in state, the appearance of bubbles, for example in the case of electrophoresis or electroosmotic transfer, a vaporization or a change in temperature.

The invention is also of benefit where a great many microchannels are used in parallel, because it makes it possible to avoid the use of complex and bulky flow control systems.

The invention is also advantageous in cases where the product contained in the microchannel or microchannels is not very viscous, or when the microchannel or microchannels are relatively short, for example 10 cm long or shorter, or even 5 cm long, in which case parasitic flows may easily occur, even after small variations in pressure.

More generally, the invention is particularly suited to the control of flow when this flow is of special importance to the performance, such as, for example, in devices involving two non-miscible (liquid/liquid) fluids or high-resolution separations.

The invention also allows the implementation of a method for transferring and exchanging heat within a microfluidic device. It is thus possible to circulate, in a first microchannel adjacent to a second microchannel, a hot or cold liquid for heating or cooling the product in the second microchannel. This thermal regulation may be performed by controlling the rate of flow in the first microchannel.

According to another of its aspects, another subject of the present invention is a microfluidic device comprising at least one microchannel in communication at each end with a chamber each connected to an inlet circuit and an outlet circuit between which circuits a flow of fluid can be established, at least one of the inlet and outlet circuits being controllable so as to modify the pressure at the end of the microchannel.

According to another of its aspects, another subject of the present invention is a device comprising at least one microchannel connected at one end to a chamber, characterized in that the chamber communicates with an inlet circuit and an outlet circuit, between which a flow of fluid can be established, at least one of the inlet and outlet circuits comprising a progressively controllable valve so as to modify the pressure at the end of the microchannel.

According to another of its aspects, a further subject of the present invention is a microfluidic device comprising at least one microchannel communicating with a chamber connected to a fluid supply and provided with a leakage allowing the fluid from the fluid supply to leave the chamber, the supply being controllable so as to modify the pressure at the end of the microchannel.

The leakage may be formed of an orifice of predetermined cross section, consisting for example of the aperture of a needle valve. The leakage is advantageously adjustable as a function of the characteristics of the microfluidic device and of the product flowing in the microchannel.

Another subject of the invention is a microfluidic device comprising one or several microchannels at least one of which is connected at one end to a chamber having a volume more than 5 times, preferably several orders of magnitude $10^n$ greater than that of the microchannel, with $n \geq 1$ and preferably $n \geq 2$, characterized in that it further comprises an inlet circuit and an outlet circuit which are connected to the chamber and between which a flow of fluid may be established, at least one of the circuits—the inlet circuit and/or the outlet circuit—being controllable so as to modify the pressure at the end of the microchannel.

According to another of its aspects, a further subject of the invention is a microfluidic device comprising at least one microchannel connected at one end to a chamber, characterized in that it further comprises an inlet circuit and an outlet circuit which are connected to the chamber and between which a flow of fluid can be established, at least one of the circuits—the inlet circuit and/or the outlet circuit—being controllable so as to modify the pressure at said end of the microchannel, the outlet circuit comprising a pressure source consisting of a pressure well or communicating directly or indirectly with a pressure well such as the atmosphere.

According to another of its aspects, another subject of the invention is a microfluidic device comprising at least one microchannel connected at one end to a chamber, characterized in that it further comprises an inlet circuit and an outlet circuit which are connected to the chamber and between which a flow of fluid can be established, at least one of the circuits—the inlet circuit and/or the outlet circuit—being controllable so as to modify the pressure at said end of the microchannel, the outlet circuit comprising a pressure source having a pressure that is more or less constant at least while the product is flowing in the microchannel.

According to another of its aspects, another subject of the invention is a microfluidic device comprising at least one microchannel connected at one end to a chamber, the device further comprising an inlet circuit and an outlet circuit which are connected to the chamber and between which a flow of fluid can be established, at least one of the circuits—the inlet circuit and/or the outlet circuit—being controllable so as to modify the pressure at said end of the microchannel, the flow of fluid having a flow rate significantly higher than that of a product in the microchannel, preferably at least ten times higher, and better still several orders of magnitude $10^n$ higher, with $n \geq 2$.

According to another of its aspects, another subject of the invention is a microfluidic device comprising at least one microchannel connected at one end to a chamber, further comprising an inlet circuit and an outlet circuit which are connected to the chamber and between which a flow of fluid can be established, at least one of the circuits—the inlet circuit and/or the outlet circuit—being controllable so as to modify the pressure at said end of the microchannel, the hydrodynamic loss over at least one of the circuits—inlet and/or outlet—, particularly over the outlet circuit, being significantly smaller that of the microchannel, preferably at least ten times smaller, and better still, several orders of magnitude ion smaller, with $n \geq 2$.

According to another of its aspects, another subject of the invention is a microfluidic device comprising at least one microchannel connected at one end to a chamber, characterized in that it further comprises an inlet circuit and an outlet circuit which are connected to the chamber and between which a flow of fluid can be established, at least one of the circuits—the inlet circuit and/or the outlet circuit—having a hydrodynamic loss that is controllable so as to modify the pressure at said end of the microchannel, independently of the pressure at another end of the microchannel.

Another subject of the invention is a pressure monitoring system comprising at least one chamber that can be connected to one end of a microchannel, characterized in that it comprises an inlet circuit and an outlet circuit which are connected to the chamber and between which a flow of fluid can be established without contact with the microchannel, at least one of the circuits—the inlet circuit and/or the outlet circuit—being controllable so as to modify the pressure at the end of the microchannel.

Another subject of the invention is a pressure monitoring system comprising at least one chamber that can be connected to one end of a microchannel, the system being designed to allow microchannels to be connected in a modular manner to this system, it being possible for example for this system to comprise modules the number of which may be chosen to suit the desired number of microchannels.

This system may also optionally comprise at least one module designed to control, within the microfluidic device, a parameter other than the pressure, for example an electrical voltage.

According to another of its aspects, another subject of the invention is, independently or in combination with the foregoing, a microfluidic device comprising:
  a first plate within the thickness of which one or several chambers are at least partially formed,
  at least one sealing member designed to isolate at least one of the chambers from the outside, a support bearing one or several microchannels, this support in particular comprising two superposed plates, one defining the bottom of the microchannel or microchannels and the other the top wall thereof, the support being able to be pressed against the first plate, each chamber communicating in a sealed manner with one end of a microchannel.

In one embodiment of the invention, the chamber communicates with one end of the microchannel via a flexible duct fixed for example to the first plate. This duct may be designed to provide sealing between the first plate and the support when these are assembled.

According to another of its aspects, another subject of the invention is, independently or in combination with the foregoing, a microfluidic device comprising:
a microchannel,
a chamber communicating with one end of the microchannel via a duct,
a tube inserted into the chamber and opening more or less in the end of the duct.

According to another of its aspects, another subject of the invention is a method for separating substances contained in a product, characterized in that it comprises the steps consisting in:
circulating said product through a microchannel or a network of microchannels of a microfluidic device as defined above, and
monitoring either the rate of flow of said product in the microchannel or network of microchannels, or the pressure difference between ends of the microchannel or microchannels.

According to another of its aspects, another subject of the invention is a method for monitoring a chemical reaction or a change in state, characterized in that it comprises the steps consisting in:
circulating said product through a microchannel or a network of microchannels of a microfluidic device as defined above, and
monitoring either the rate of flow of said product in the microchannel or network of microchannels, or the pressure difference between ends of the microchannel or microchannels.

Figure 2:
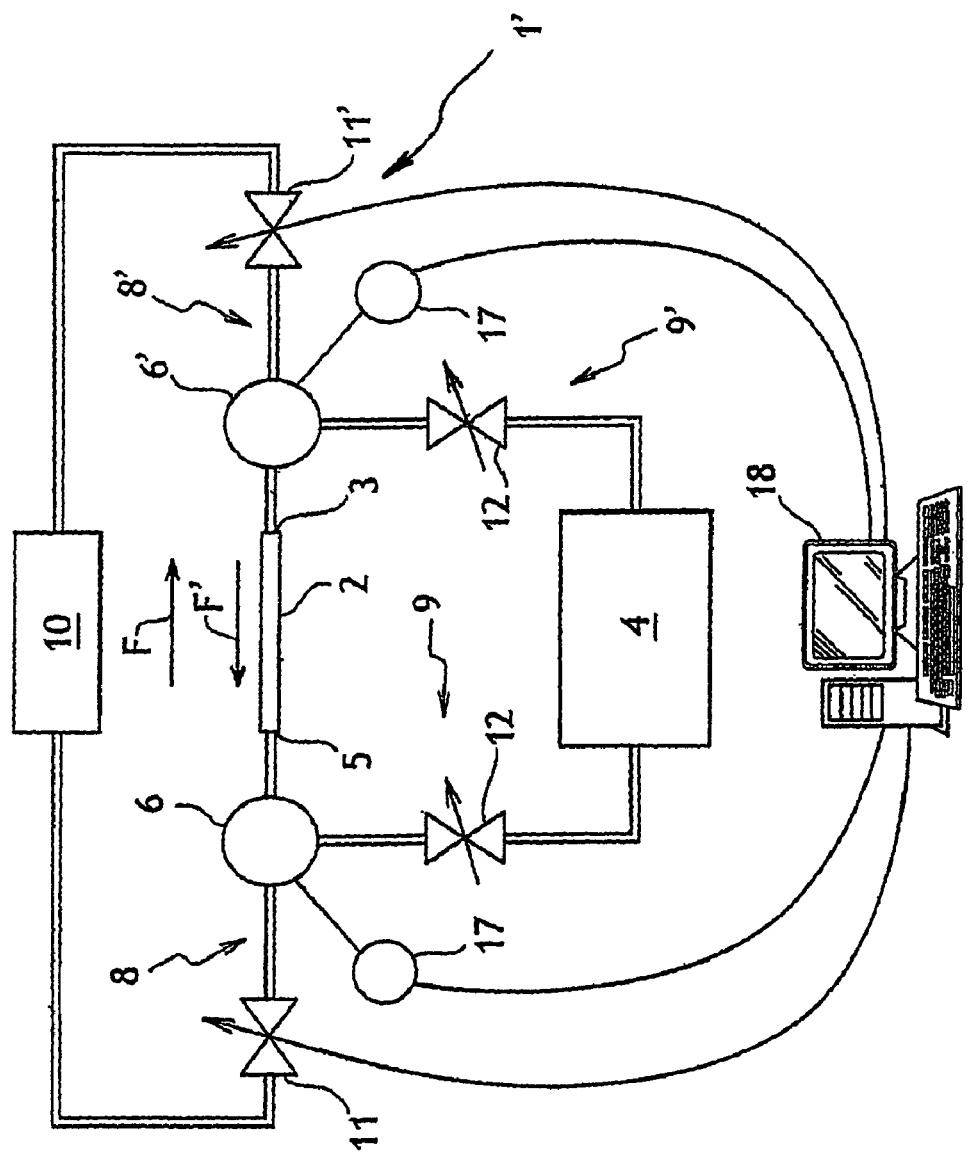
Figure 3:
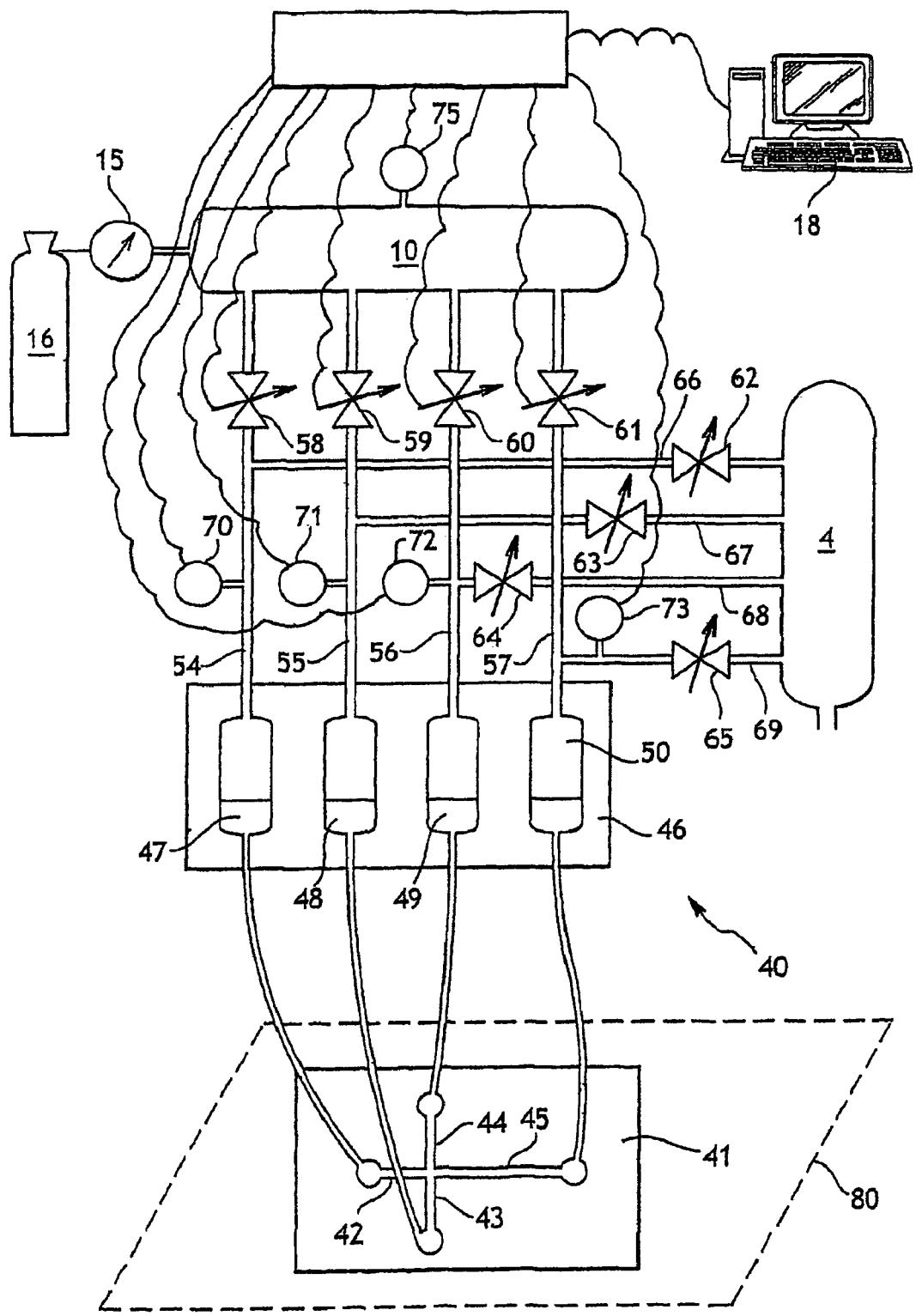
Figure 4A:
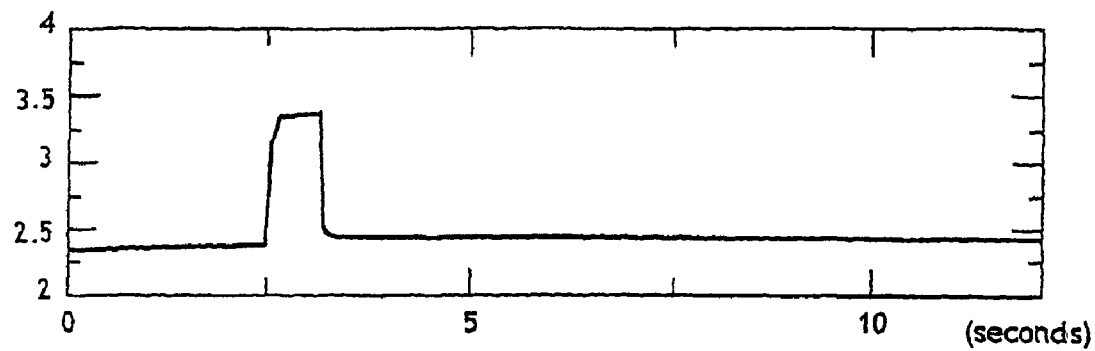
Figure 4B:
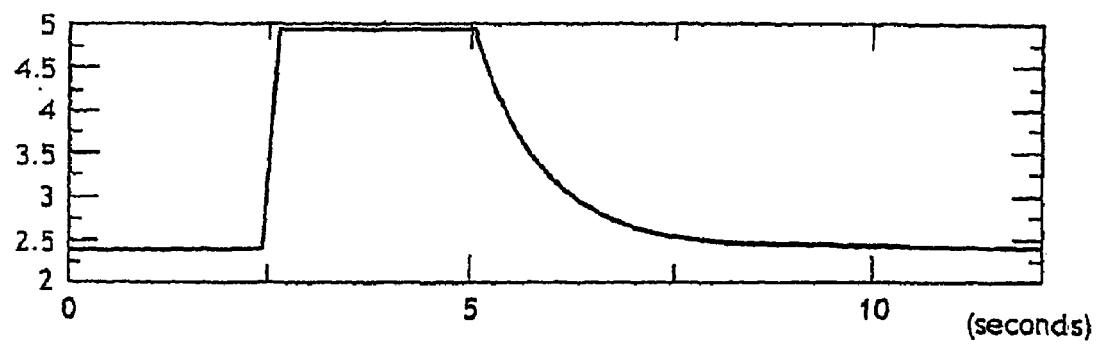
Figure 4C:
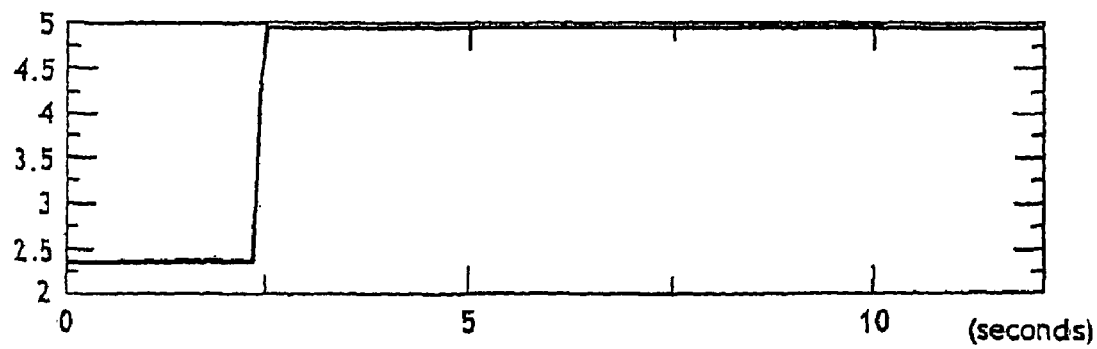
Figure 5:
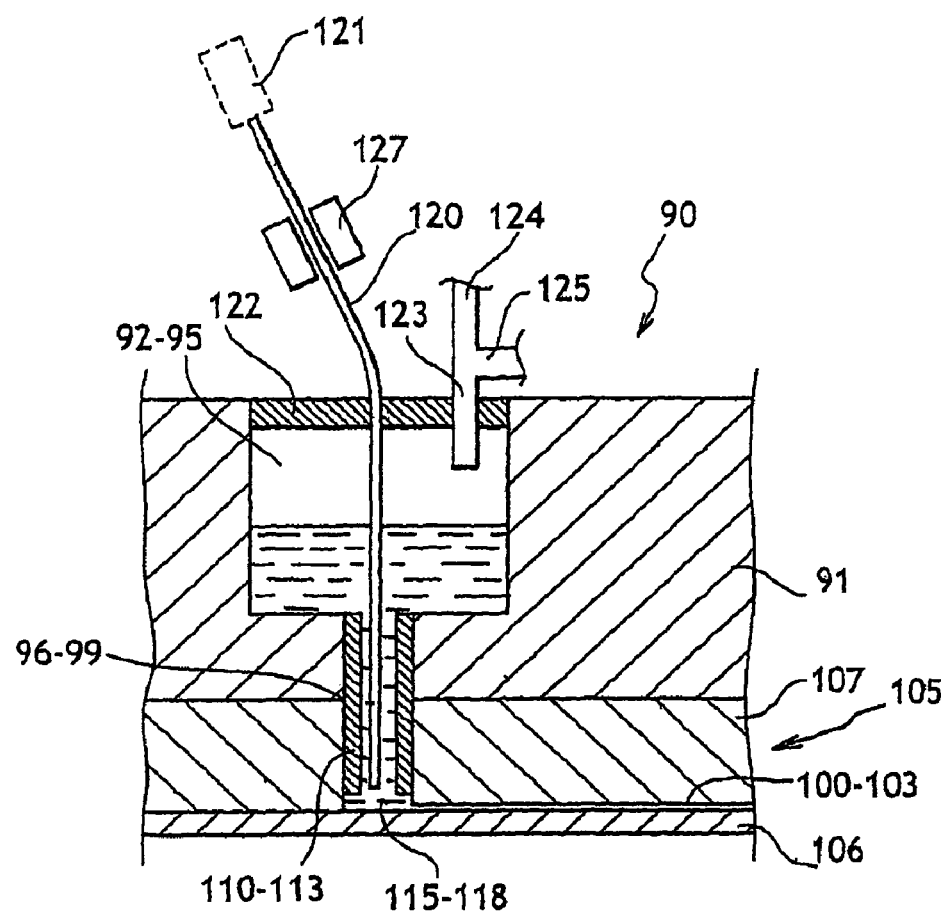
Figure 6:
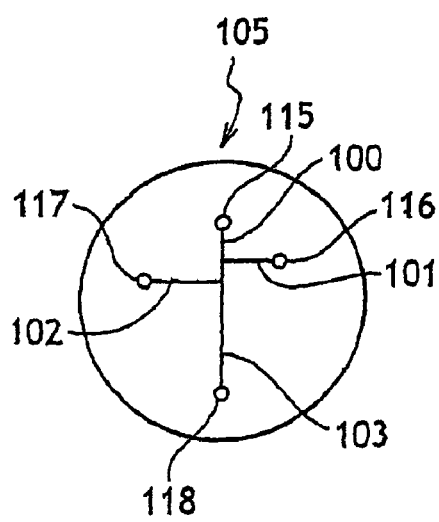
Figure 7:
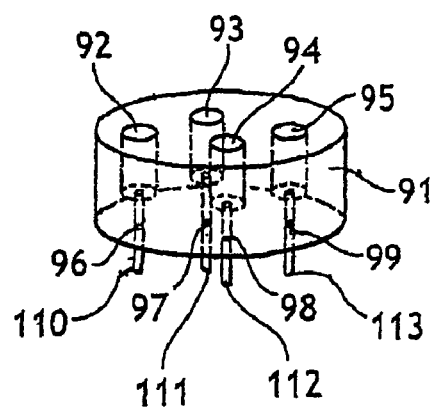
Figure 8:
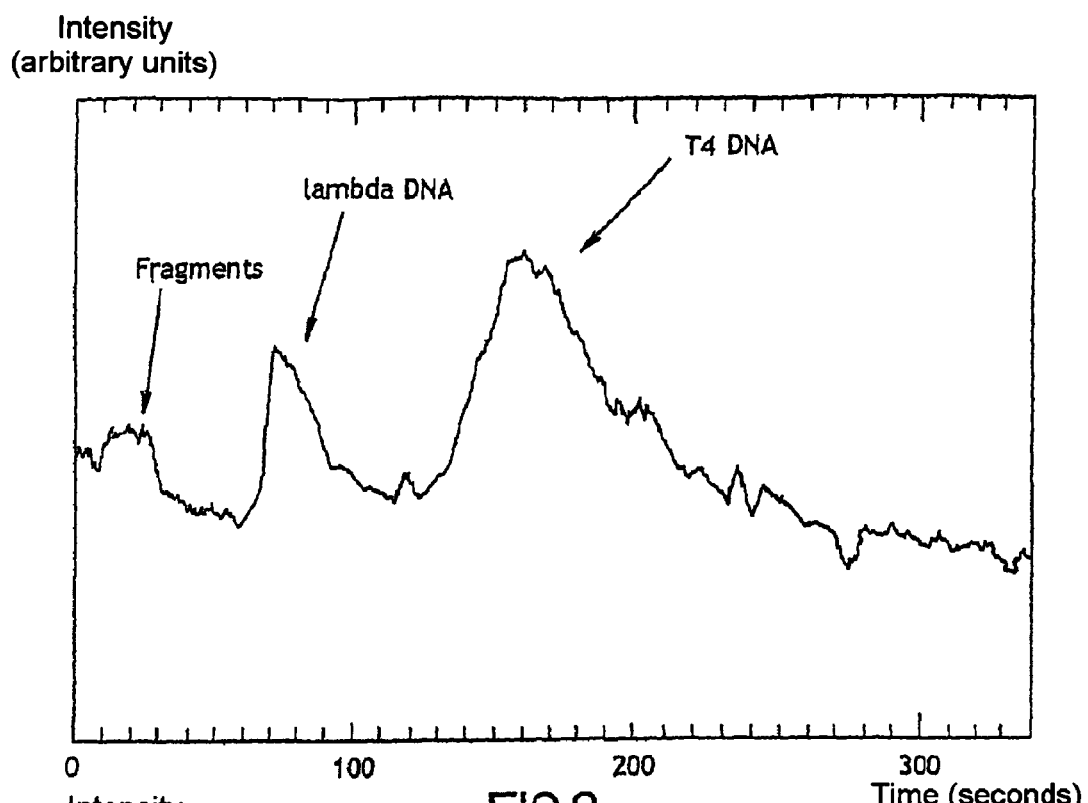
Figure 9:
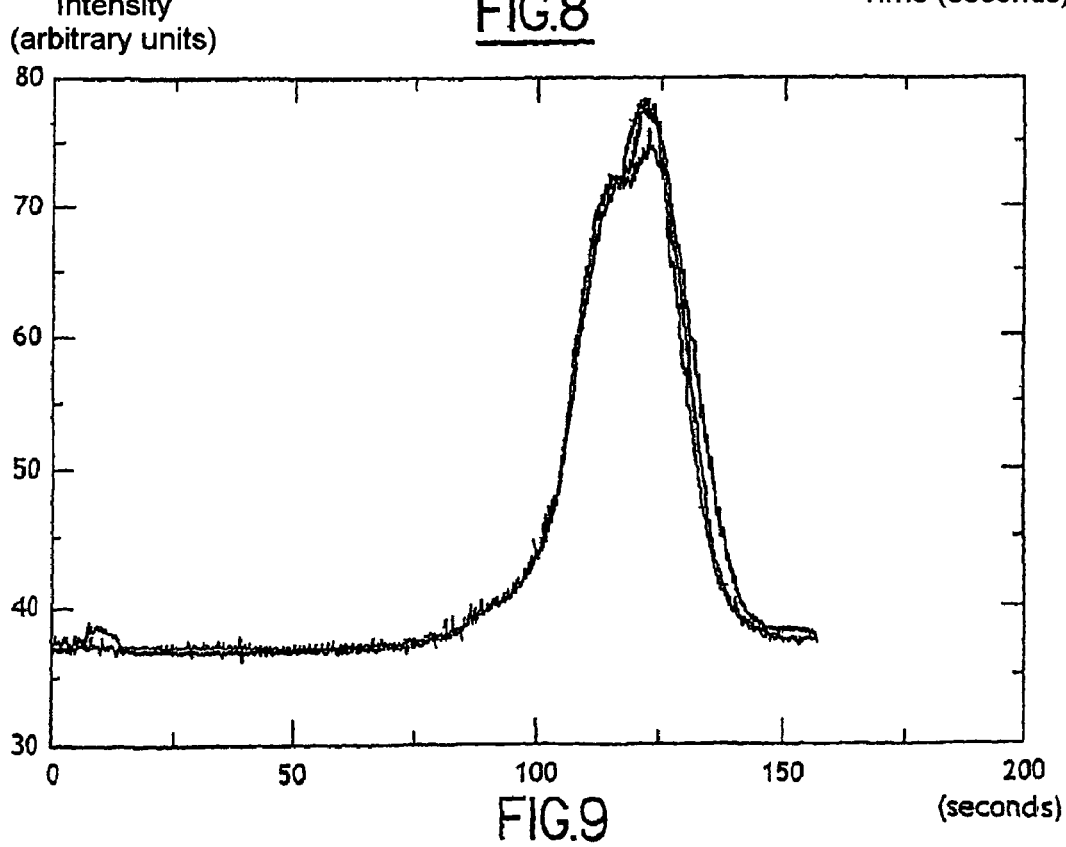

The invention may be better understood from reading the detailed description which will follow, of some nonlimiting exemplary embodiments, and from examining the attached drawing, in which:

FIG. 1 is a schematic and partial view of a microfluidic device according to a first embodiment of the invention, comprising a single microchannel, FIG. 2 schematically and partially depicts a variant of the embodiment of the microfluidic device of FIG. 1, FIG. 3 schematically and partially depicts a microfluidic device according to another embodiment of the invention, comprising microchannels arranged in a cross configuration, FIGS. 4A to 4C illustrate the change in pressure at one end of the microchannel communicating with inlet and outlet circuits, in response to an opening of the inlet circuit for one second, when the outlet circuit is closed, half-closed and fully closed, respectively, FIG. 5 schematically and partially depicts, in section, a microfluidic device according to another embodiment of the invention, FIG. 6 is a schematic and partial view from above of the support of the device of FIG. 5, on which a network of microchannels is produced, FIG. 7 schematically and partially depicts the plate of the device of FIG. 5, on which chambers have been produced, FIG. 8 depicts a first example of a DNA separation curve as a function of time, this having been obtained by implementing the invention, and FIG. 9 depicts a second example comprising three DNA separation curves as a function of time, these having been obtained by repeating the same process three times.

FIRST EMBODIMENT OF THE INVENTION

FIG. 1 depicts a microfluidic device 1 according to a first embodiment of the invention, comprising a microchannel 2 connected, at one end 3, to a first pressure source 4 and, at the other end 5, to a closed chamber 6 via a flexible duct 7.

The chamber 6 contains a product S, liquid in the example described, to be distributed in the microchannel 2.

The chamber 6 communicates, on the one hand, via a duct 13, with an inlet circuit 8 associated with a second pressure source 10 and, on the other hand, via a duct 14, with an outlet circuit 9 associated with the first pressure source 4.

The first pressure source 4 is a pressure $P_1$ and the second pressure source 10 contains a gas at the pressure $P_2$.

It will be noted that, in the present invention, the pressure values are related to a reference pressure, for example atmospheric pressure.

According to a variant, one of the pressures $P_1$ or $P_2$ may itself correspond to atmospheric pressure. In this case, the corresponding pressure source (for example the pressure source 4) advantageously comprises a pressure damper in communication with the atmosphere, the damper protecting the device from sharp fluctuations in the surrounding pressure.

In the example described, the pressure $P_2$ is higher than the pressure $P_1$.

The pressure $P_2$ is kept constant using a pressure regulator 15 connected to a nitrogen cylinder 16.

As a variant, the pressure source 10 may be associated with the chamber of a compressor.

A solenoid valve 11 is placed in the path of the duct 8 to regulate the flow rate of gas from the pressure source 10.

A needle valve 12 is placed in the path of the duct 9 so as to control the flow rate of gas leaving the chamber 6.

By regulating the opening of the valves 11 and 12 it is possible to establish a flow of gas in the chamber 6 between the inlet 8 and outlet 9 circuits.

The outlet circuit 9 constitutes a leakage for the gas from the inlet circuit 8.

The flow rate I of the product S in the microchannel 2 can be regulated by in particular altering the difference in pressure P between the two ends 3 and 5 of the microchannel 2. This flow rate I can be expressed using the approximated formula:

$$I = r^4 P / 8L$$

r being the radius of the microchannel and L being its length.

This formula is valid for a microchannel of circular cross section, other expressions being known or obtainable by solving Stokes equation for channels of different cross section.

By analogy with electrical circuits, the difference in pressure P can be related to the flow rate I using the formula:

$$P = RI$$

where R is termed the microfluidic resistance and is given by the approximate formula:

$$R = 8L / r^4$$

In the example concerned, the microfluidic resistance associated with the microchannel is denoted $R_c$, that associated with the outlet circuit 9 is denoted $R_f$ and that associated with the inlet circuit 8 is denoted $R_e$.

Under steady state conditions, the flow rate $I_c$ in the channel is given by:

$$I_c = \frac{P_f}{R_c}$$

where $P_f = P_1 \times R_f R_c / (R_f R_c + R_e R_f + R_e R_c)$

It will be noted that it is possible to regulate this flow rate $I_c$ by varying the extent to which the valve 11 is open, that is to say the value $R_e$, smoothly, it being possible for $R_e$ to vary continuously.

Furthermore, the characteristic stopping time for the flow following closure of the valve 11 ($R_e$ switching from a finite value to an infinite value) is given by:

$$T = V_1 R_c \Big/ \left(\frac{R_c}{R_f} + 1\right)$$

$V_1$ being the volume of gas contained in the chamber 6.

In known devices in which the product chamber is not connected to an outlet circuit or a leakage, this characteristic time T is of the order of $(R_c V_1)$. As the resistance of a microchannel $R_c$ is relatively high, this characteristic time is generally lengthy, possibly ranging as high as several tens of minutes approximately.

By virtue of the invention, it is possible to choose the value $R_f$ and bring the characteristic time T down to relatively low values, for example of a few seconds.

It will be noted that the viscosity to be taken into consideration when calculating the value of $R_f$ is that of the gas, namely several orders of magnitude lower than that of the liquid contained in the microchannel 2.

In the example considered, the solenoid valve 11 is connected to a regulating system 18 allowing its opening to be controlled as a function of pressure information delivered by a pressure sensor 17 measuring the pressure of the gas in the chamber 6.

It is thus possible to have dynamic control over the pressure of the gas in this chamber 6.

The regulating system 18 may be arranged in such a way as to take account of other information items, and particularly those associated with the flow of the product in the microchannel 2.

Without departing from the scope of the present invention, the needle valve 12 may be replaced by a solenoid valve also connected to the control system so that the device 1 can be controlled entirely automatically without user intervention.

The effect of the leakage on this characteristic time taken for the device to reach equilibrium is illustrated in FIGS. 4A to 4C.

These FIGS. 4A to 4C depict the change in pressure as a function of time.

FIG. 4A corresponds to the case where the needle valve of the outlet circuit is wide open, FIG. 4B to the case where it is half open, and FIG. 4C to the case where it is closed.

In all cases, the solenoid valve of the inlet circuit has been opened for a time of one second.

In FIG. 4A it can be seen that the pressure in the chamber rapidly reaches a constant and stable value and rapidly returns to equilibrium when the solenoid valve of the inlet circuit is closed, in a time shorter than one second.

In FIG. 4B it can be seen that with a less effective leakage, on the one hand, the pressure saturates the pressure sensor and, on the other hand, the return to equilibrium takes ten seconds or so, which is less advantageous for flow regulation.

Finally, when the needle valve is not open, the pressure sensor remains saturated throughout the experiment, demonstrating that it is impossible to stop the flow in the channel if there is no leakage.

In the example considered, only the end 5 of the microchannel 2 is subject to pressure control.

If the respective pressures at both ends 3 and 5 of the microchannel 2 were to be controlled simultaneously, this would not constitute a departure from the scope of the present invention.

Second Embodiment of the Invention

FIG. 2 depicts a microfluidic device appreciably similar to the device 1, comprising a microchannel 2 connected at each end 3, 5 to a chamber 6, 6'.

Each chamber 6, 6' is in communication, in the same manner as the device 1, with an inlet circuit 8, 8' and an outlet circuit 9, 9'.

The two inlet circuits 8, 8' are associated with a common pressure source 10 and the two outlet circuits 9, 9' with a common pressure source 4.

The device 1' allows the product S contained in the microchannel 2 to be moved in one direction or the other.

Thus, to move the product in the direction of the arrow F, the solenoid valve 11' of the inlet circuit 8' is closed, the needle valve 12 of the outlet circuit 9' being open so that the end 3 of the microchannel is at the pressure $P_1$.

A flow of gas from the inlet circuit 8 toward the outlet circuit 9 is then established in the chamber 6 so as to increase the pressure in this chamber 6 and cause the product S to move in the direction of the arrow F as a result of the pressure difference between the ends 3 and 5 of the microchannel 2.

In order to move the product in the other direction, namely in the direction of the arrow F', the solenoid valve 11 of the inlet circuit 8 is closed and the needle valve 12 of the outlet circuit 9 is opened and a flow of gas is established in the chamber 6 between the inlet 8' and outlet 9' circuits.

Third Embodiment of the Invention

FIG. 3 depicts a microfluidic device 40 according to another embodiment of the invention.

This device 40 is used in particular for electrophoresis separation and comprises a microfluidic cell 41 in which microchannels 42-45 are produced in a cross configuration. In the example considered, the microchannels 43 and 44 are in the continuation of one another.

This cell 41 is prepared in a block of PDMS marketed under the name of Sylgard 184 by Dow Corning, as described for example in Y. Xia, G. M. Whitesides, Angew. Chem. Int. Ed. 37, 550 (1998).

Orifices are pierced in the block of PDMS in order to place the ends of each of the channels 42-45 in communication respectively with chambers 47-50 borne by a connecting block 46.

One of the ends of the microchannels may possibly be connected to a reaction chamber.

The chambers 47-50 are connected by ducts 54-57 to a common pressure source 10, via proportional-control valves 58-61 marketed under the name KV Automation 01 216 002 20.

The pressure source 10 is of the type described with reference to FIG. 1.

The ducts 54-57 are each connected, between the chambers 47-50 and the valves 58-61, to a second duct 66-69.

The ducts 66-69 define leaks that can be adjusted via needle valves 62-65 marketed by Upchurch Scientific, in communication with the pressure source 4 as described with reference to FIG. 1.

In the same manner as the device 1, each chamber 47-50 is connected to an inlet circuit controllable by the valves 58-61 and an outlet circuit controllable by the valves 62-65.

A flow of gas can thus be established between each valve 58-61 and the corresponding valve 62-65.

Each duct 54-57 is connected to a pressure sensor 70-73 for measuring the pressure of the gas in the chambers 47-50.

A sensor 75 allows the pressure of the pressure source 10 to be measured.

The solenoid valves 58-61 are operated via the regulating system 18.

The microfluidic cell 41 is placed on an inverted microscope 80 marketed under the name Zeiss Axiovert 135, fitted with a low-magnification objective lens (10×).

In order to estimate the characteristic time of the device, one procedure may be as follows:

To start off with, the pressure of the pressure source 10 is regulated by acting on the regulator 15, setting it to a value of between 0.01 and 1 bar, that is to say of between $10^3$ Pa and $10^5$ Pa, relative to atmospheric pressure.

The chamber 49 is partially filled with filtered water to which 0.1% surfactant marketed under the name Pluronic F127 by BASF has been added in order to improve wetability, and the filling of the channels 42-45 by capillary effect is awaited.

If necessary, in order to speed up the process or eliminate any residual bubbles, the chamber 49 may be pressurized.

When, by looking down the microscope, it is seen that the channels 42-45 are full, the chambers 48 and 50 are partially filled with filtered water, and the chamber 47 is partially filled with a solution containing particles that are easy to see under a microscope (for example water to which 1% of full-fat milk has been added, the oil emulsion contained in the milk serving as a flow label).

It is preferable to fill the chamber 50 to a level higher than that of the other chambers 47-49, this chamber 50 acting as a reference.

It is found that by increasing the pressure in the chamber 47 it is easy to cause the water to which milk has been added to enter the channel 42, and to move it there through at a predetermined rate.

By regulating the pressures in the chambers 47-50 it is thus possible to start or stop the product at will in each of the channels 42-45, with a short characteristic time.

By acting on the needle valves 62-65 it is possible to increase or reduce this characteristic time at will, from a few minutes to about one second.

Fourth Embodiment of the Invention

In this embodiment illustrated in FIGS. 5 to 7, the microfluidic device 90 comprises a plate 91 in the thickness of which chambers 92-95 are produced. Each chamber opens onto the underside of the plate 91 via an outlet orifice 96-99.

The microfluidic device 90 further comprises a support 105 in which microchannels 100-103 are produced in a cross configuration, the lateral microchannels 101 and 102 being slightly offset from one another as can be seen in FIG. 6.

This support 105 consists of two superposed plates 106 and 107, one of them, 106, defining the bottom of the microchannels and the other, 107, defining a top wall thereof.

Having assembled the plate 9 with the support 105 as illustrated in FIG. 5, each chamber 92-95 communicates in a sealed manner with one end of a microchannel 100-103 of the support 105 via a flexible duct 110-113 fixed to the plate 91.

Each duct 110-113 opens into the bottom of a chamber 115-118 of the support 105, each chamber 115-118 communicating with one end of a microchannel.

Each chamber 92-95 may be supplied with product via a small-diameter flexible tube 120 which is inserted into the corresponding duct 110-113 and opens into the end thereof, as can be seen in FIG. 5.

The fact that the tube 120 opens into the end of the duct 110-113 makes it possible to avoid the formation of bubbles when the chamber is being filled.

This tube 120 may be connected to a microsyringe 121 containing the product to be injected into the corresponding chamber, or to a micropipette allowing suction or a raised pressure to be used to draw up a sample into a sample holder, for example a microtitration plate.

Each chamber 92-95 is closed in a sealed manner by a seal 122.

A duct 123 communicating with the inlet 124 and outlet 125 circuits is inserted into each chamber 92-95 so as to allow the pressure therein to be controlled.

Each tube 120 may be associated with a clamp device 127 controlled electromechanically for example, designed to control the flow rate in the tube 120 by deforming this tube.

Various applications of the invention will now be presented.

FIRST APPLICATION EXAMPLE

Separation of DNA by Electrophoresis

It is assumed that use is being made of the device 40 of the third embodiment described hereinabove.

The cell 41 is placed in a magnetic coil positioned on the stage of the microscope 80.

A solution of magnetic particles in TBE buffer as described in Doyle, Science, 295, 2237 (2002) is introduced into the chamber 49 and the collection of channels 42-45 is filled with this solution, by applying a slight raised pressure to the chamber 49.

Once the channels 42-45 have been filled, a magnetic field is applied by passing a current through the magnetic coil. This has the effect of creating a network of magnetic columns in the channels.

TBE buffer is then introduced into the chambers 47 and 50, and the DNA solution for analysis is introduced into the chamber 48.

The DNA solution containing, for example, 48.5 kilobase pairs of lambda phage DNA and 166 kilobase pairs of T4 phage DNA are then circulated from the chamber 48 toward the chamber 50 in the channels 43 and 45, applying a raised pressure of the order of 0.1 bar ($10^4$ Pa) in the chamber 48, and a lower raised pressure of the order of 0.02 bar ($2 \times 10^3$ Pa) in the chambers 47 and 50.

Finally, the pressures in all the chambers are eliminated and the DNA is caused to migrate to the channel 44 by applying between the chambers 47 and 49, an electrical potential difference using electrodes positioned in the chambers 47 and 49.

As an option, electrodes placed in the chambers 48 and 50 make it possible to prevent the DNA contained in the channels 43 and 45 from creating parasitic background noise in the channel 44 as described, for example, in C. S. Effenhauser, A. Manz, H. M. Widmer, Anal. Chem. 65, 2637 (1993).

By virtue of the needle valves, the bubbles created by the electrolysis of the electrodes can escape without disrupting the flow of the fluid contained in the channels.

As can be seen by way of example in the curve of FIG. 8, a separation into several peaks is obtained in just a few minutes whereas the same separation in conventional electrophoresis systems on gel takes twelve hours or so.

Furthermore, the entire operation can be repeated many times over without manual intervention on the device, simply by controlling it from the regulating system 18, as required or in a preprogrammed fashion.

The invention makes it possible to obtain excellent repeatability of the separation curves as can be seen in FIG. 9.

SECOND APPLICATION EXAMPLE

Digestion of Proteins by Enzymes

In this application example, magnetic beads acting as a support for tripsine are introduced into the microchannel or microchannels, these beads being immobilized using a magnet. A product containing the proteins that are to be digested is then circulated through the microchannel or microchannels.

The invention allows precise control over the movement of the protein fragments thus generated and makes them easier to identify, for example by electrophoresis or chromatography, possibly coupled with mass spectrometry.

THIRD APPLICATION EXAMPLE

Heterogeneous Catalysis

In this application example, the catalyst is fixed to a wall of the microchannel or to magnetic beads immobilized by a magnet.

The product supposed to react with the catalyst is then circulated through the microchannel.

FOURTH APPLICATION EXAMPLE

Chemical Synthesis

The cross-configured network of microchannels of the device 40 can be used to send two reagents, from two microchannels, for example 42 and 45, toward the intersection of the microchannels and to observe the dynamics of the reaction that occurs there. For example, the other two microchannels 43 and 44 can be used to remove the product of the reaction.

The invention claimed is:

1. A pressure monitoring device comprising:
a chamber configured to be connected at one end of at least one microchannel,
an inlet circuit in fluid communication with the chamber, and
an outlet circuit separate from said inlet circuit and in fluid communication with the chamber,
wherein a substantially continuous flow of fluid can be established from the inlet circuit to a point in fluid communication with said chamber, and from said point to the outlet circuit without contact with the microchannel, and at least one of the inlet and outlet circuits comprises a progressively controllable valve so as to control flow rate in the inlet and outlet circuits so as to modify the pressure at said end of the microchannel.

2. The device according to claim 1, wherein said fluid is present in the chamber and is different from a product or products contained in the microchannel.

3. The device according to claim 1, wherein the fluid is a gas.

4. The device according to claim 2, wherein the product contained in the microchannel is a liquid.

5. The device according to claim 1, further comprising a microchannel wherein the microchannel has a surface/volume ratio higher than 1 mm$^{-1}$.

6. The device according to claim 1, wherein the volume of the chamber is between 10 mm$^3$ and 5000 mm$^3$.

7. The device according to claim 1, further comprising a microchannel wherein the chamber is connected to the microchannel and hydrodynamic loss over at least one of the inlet and outlet circuits is lower than that of the microchannel.

8. The device according to claim 1, further comprising a microchannel wherein the microchannel is connected to the chamber by a duct entirely filled with one or several liquids.

9. The device according to claim 1, wherein the inlet and outlet circuits each comprise a pressure source, the pressures thereof being different.

10. The device according to claim 1, further comprising a microchannel wherein the outlet circuit and one of the ends of the microchannel are in communication with a common pressure source.

11. The device according to claim 1 wherein the valve is a solenoid valve or a needle valve.

12. The device according to claim 1, wherein at least one of the inlet and outlet circuits is connected to a dynamic regulation system able to control the inlet or outlet circuit as a function of an item of information associated with flow or pressure.

13. The device according to claim 12, wherein said information item is delivered by a cascade of sensors having different operating ranges.

14. The device according to claim 1, further comprising a microchannel wherein the microchannel is produced by at least one of engraving, molding, extrusion, injection, hot or cold compression, on or in a support.

15. The device according to claim 4, wherein the chamber is configured to communicate with the one end of the microchannel via a duct and the liquid can be provided via a tube introduced into the duct.

16. The device according to claim 1, further comprising a second chamber configured to be connected at a second end of the microchannel, the second chamber being in communication with a second inlet circuit and with a second outlet circuit, a flow of fluid may be established between the second inlet circuit and the second outlet circuit.

17. The device according to claim 1, wherein the device comprises a plurality of microchannels, at least two of which are each connected at one end to a different chamber, each different chamber being in communication with a respective inlet circuit and a respective outlet circuit, a flow of fluid may be established between the respective inlet circuit and the respective outlet circuit, at least one of the respective inlet circuit and the respective outlet circuit being controllable so as to modify the pressure at the end of each of the at least two microchannels.

18. The device according to claim 1, wherein the device further comprises at least one electrode.

19. The device according to claim 18, further comprising a microchannel wherein the electrode is in the chamber, the chamber being in communication with the microchannel via an electrically conductive liquid.

20. The device according to claim 1, wherein the chamber is produced at least partially on a plate, the plate being separate from plates defining the microchannel.

21. The device according to claim 1, wherein the microchannel has a surface/volume ratio higher than 10 mm$^{-1}$.

22. The device according to claim 1, wherein hydrodynamic loss over at least one of the inlet circuit and the outlet circuit is at least ten times lower than that of the microchannel.

* * * * *